United States Patent [19]

Hsiao et al.

[11] Patent Number: 5,500,883

[45] Date of Patent: Mar. 19, 1996

[54] METHOD AND SYSTEM FOR EFFICIENTLY GENERATING RADON DERIVATIVE DATA IN A CONE BEAM COMPUTERIZED TOMOGRAPHY IMPLEMENTATION

[75] Inventors: Meng-Ling Hsiao; Kwok C. Tam, both of Schenectady, N.Y.; Edward A. Hudacko, Arlington, Va.

[73] Assignee: General Electric Company, Schenectady, N.Y.

[21] Appl. No.: 349,227

[22] Filed: Dec. 5, 1994

[51] Int. Cl.⁶ .......................... A61B 6/03; G01N 23/083
[52] U.S. Cl. .......................... 378/4; 378/901; 364/413.16
[58] Field of Search .................. 378/4, 901; 364/413.15, 364/415.16, 413.19

[56] References Cited

U.S. PATENT DOCUMENTS

| | | | |
|---|---|---|---|
| 5,253,171 | 10/1993 | Hsiao et al. ........................ | 364/413.19 |
| 5,257,183 | 10/1993 | Tam ................................... | 364/413.19 |
| 5,333,164 | 7/1994 | Tam ................................... | 378/8 |
| 5,335,309 | 10/1994 | Eberhard et al. ................... | 364/413.15 |
| 5,365,560 | 11/1994 | Tam ................................... | 378/8 |
| 5,446,776 | 8/1995 | Tam ................................... | 378/4 |

*Primary Examiner*—David P. Porta
*Assistant Examiner*—David Vernon Bruce
*Attorney, Agent, or Firm*—David C. Goldman; Paul R. Webb, II

[57] ABSTRACT

The present invention discloses a method and system for generating Radon derivative data in a cone beam computerized tomography implementation. Radon derivative data is computed by using a plurality of processors that partition the Radon space among the processors in a manner wherein the totality of the support of the Radon space handled by each processor is approximately equal. More specifically, each processor handles a number of vertical planes in the Radon space which are equally spaced within 180° in the $\phi_k$ orientation. This procedure enables the plurality of processor to equalize the workload in computing the Radon derivative data and to perform the computations in a timely and efficient manner.

22 Claims, 8 Drawing Sheets

METHOD AND SYSTEM FOR EFFICIENTLY GENERATING RADON DERIVATIVE DATA IN A CONE BEAM COMPUTERIZED TOMOGRAPHY IMPLEMENTATION

BACKGROUND OF THE INVENTION

The present invention relates generally to three-dimensional (3D) computerized tomography (CT) and more particularly to the generation of Radon derivative data with a plurality of processors.

To acquire cone beam projection data in a cone-beam CT implementation, an object is scanned, preferably over a 360° angular range, either by moving a cone beam x-ray source in a scanning circle about the object, while keeping a two-dimensional (2D) array detector fixed with reference to the cone beam x-ray source or by rotating the object while the x-ray source and detector remain stationary. The image of the object is reconstructed by using a Radon inversion process, in which the total Radon transform of the cone beam projection data is computed. The first step in the reconstruction process is to partition the cone beam projection data into a plurality of vertical planes in Radon space. Within each vertical plane, the Radon derivative data is computed. However, computing the Radon derivative data requires a large amount of processing power and an infinite amount of time. In order to overcome this problem, cone beam CT implementations have sampled the cone beam projection data so that the Radon derivative data is computed for a finite set of uniformly spaced points. The best results have occurred by sampling the Radon space into a polar grid having a plurality of uniformly spaced grid points.

However, the computation of the Radon derivative data is still very time consuming. Another procedure that has been used to reduce the time required to compute the Radon derivative data is to use a number of processors connected in parallel. In the parallel processing procedure, the plurality of vertical planes are partitioned among the number of processors, so that each processor handles the computations of the Radon derivative data for the Radon points located on a group of adjacent planes. For example, if there are $N_{pr}$ processors and $M \times N_{pr}$ planes, then the relationship between the processors and the vertical planes would be as follows:

processor 1 processes planes 1, 2, 3 ..., M; processor 2 processes planes M+ 1, M+ 2, M+ 3 ..., 2M; ... processor $N_{pr}$ processes $(N_{pr}-1)M+1$, $(N_{pr}-1)M+2$, $(N_{pr}-1)M+3$, ..., $N_{pr}M$.

Partitioning the vertical planes so that each processor computes Radon derivative data for consecutive planes has its drawbacks. In particular, since each processor processes consecutive planes, the workload of computing the Radon derivative data is not evenly distributed among all of the processors. In this implementation, some processors will do a lot more computations than other processors. Therefore, the Radon derivative computations are not being performed in an efficient manner.

SUMMARY OF THE INVENTION

Therefore, it is a primary objective of the present invention to generate Radon derivative data in an efficient manner.

A second object of the present invention is to partition the Radon space among the processors so that each processor computes the Radon derivative data on an equal amount of vertical planes that are evenly spaced within 180°.

Thus, in accordance with the present invention, there is provided a method for generating Radon derivative data in a computerized tomography system having a plurality of processors. The method comprises providing a scanning trajectory about an object. The scanning trajectory is then discretely sampled with a plurality of uniformly spaced cone beam source positions. Cone beam energy is then emitted from the discretely sampled cone beam source positions towards the object. The cone beam energy passing through the object is acquired on a detector as cone beam projection data. The cone beam projection data is partitioned into a plurality of vertical planes in Radon space. Each vertical plane has a polar grid with a plurality of polar grid lines, circles, and points uniformly spaced in r, θ, and φ coordinates. The plurality of vertical planes are then partitioned between the plurality of processors wherein each processor processes an equal amount of vertical planes evenly spaced within 180°. Then Radon derivative data is generated for each vertical plane with the plurality of processors.

In accordance with another embodiment of the present invention, there is provided a cone beam computerized tomography system comprising a cone beam energy source. A scanning means moves the cone beam energy source about an object. Cone beam energy is emitted at the object from a plurality of uniformly spaced cone beam source positions. A detector acquires cone beam energy passing through the object as cone beam projection data. A plurality of processors are coupled to the detector. Each of the plurality of processors comprise partitioning means for partitioning the cone beam projection data into a plurality of vertical planes in Radon space. Each vertical plane has a polar grid with a plurality of polar grid lines, circles, and points uniformly spaced in r, θ, and φ coordinates. Each processor processes an equal amount of vertical planes evenly spaced within 180°. Also, included is a Radon derivative data generating means for generating Radon derivative data for each vertical plane.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
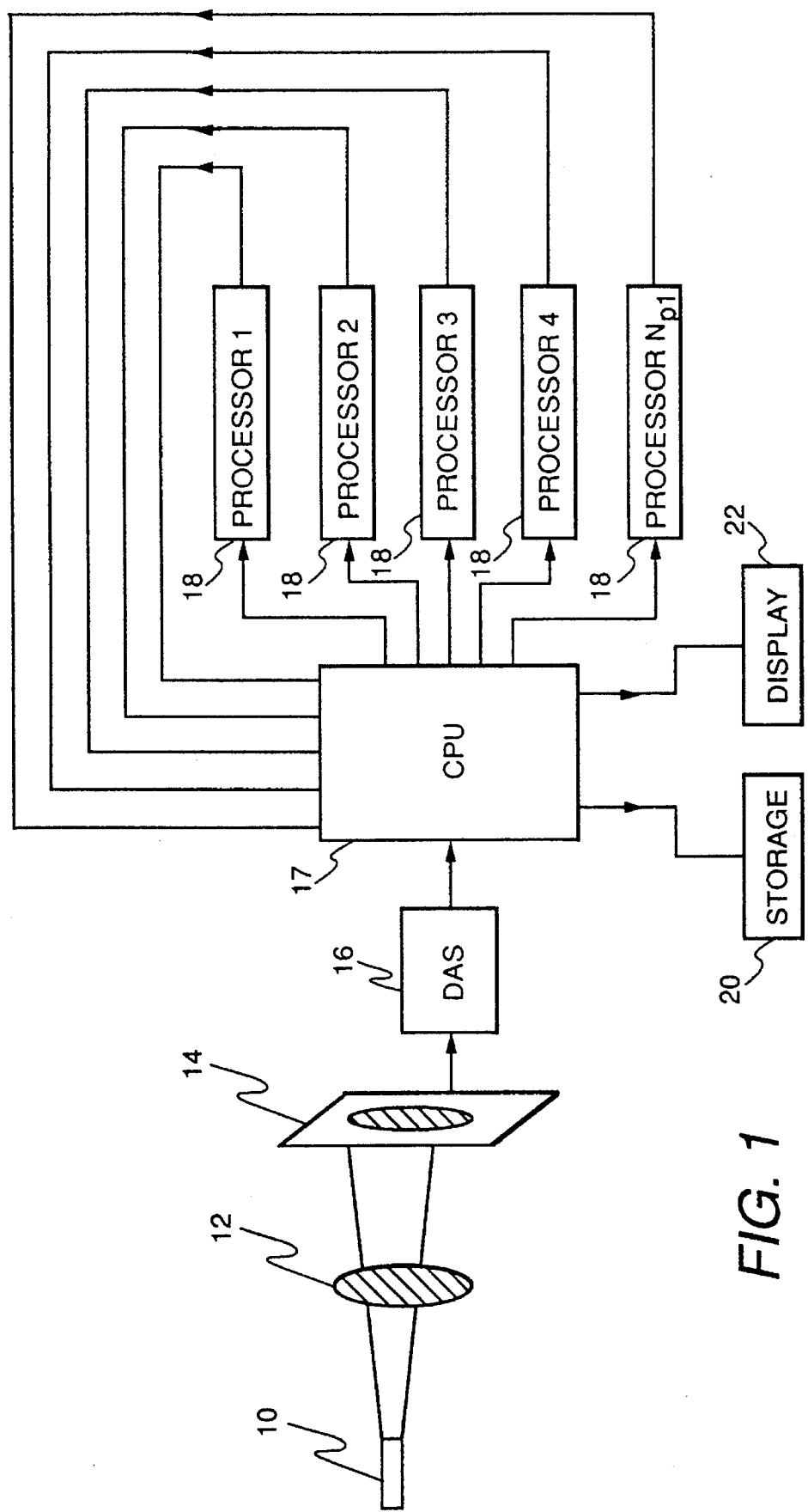
FIG. 1 is a perspective view of a cone beam CT system used in the present invention.

In FIG. 1, cone beam energy is emitted from a cone beam x-ray source 10 and passed through an object 12. The cone beam energy passing through the object is detected by a 2D array detector 14 which comprises an array of individual detector elements. Complete information is obtained by moving the cone beam x-ray source 10 and the detector 14 in relation to the object 12. For example, the object can be rotated about a vertical axis with respect to the x-ray source and the detector or the object can remain stationary while the source and detector are rotated about the object. Cone beam energy that penetrates the object is detected by the detector as cone beam projection data. The cone beam projection data is converted to corresponding electrical signals and sent to a data acquisition system 16 which registers the electrical signals. The electrical signals corresponding to the cone beam projection data in the data acquisition system (DAS) are then sent to a central processing unit (CPU) 17 and a plurality of processors 18. Each processor performs a series of data conversions that are necessary to reconstruct an image of the object. In particular, at each processor, the cone beam projection data is converted to Radon derivative data using the techniques described in the U.S. Pat. No. 5,257,183, which are incorporated herein by reference. The Radon derivative data is then converted to Radon data using techniques described in commonly assigned U.S. patent application Ser. No. 08/100,818, which is incorporated herein by reference. The Radon data at the polar grid points is then used to perform an inverse 3D Radon transformation using the techniques described in detail in commonly assigned U.S. patent application Ser. No. 07/631,818, now abandoned, which is incorporated herein by reference. After the 3D inverse Radon transformation, reconstructed image data is obtained and sent to the CPU 17. The reconstructed image data is then fed from the CPU to a storage unit 20 and a display 22, which provides a 3D CT image of the object 12.

Figure 2:
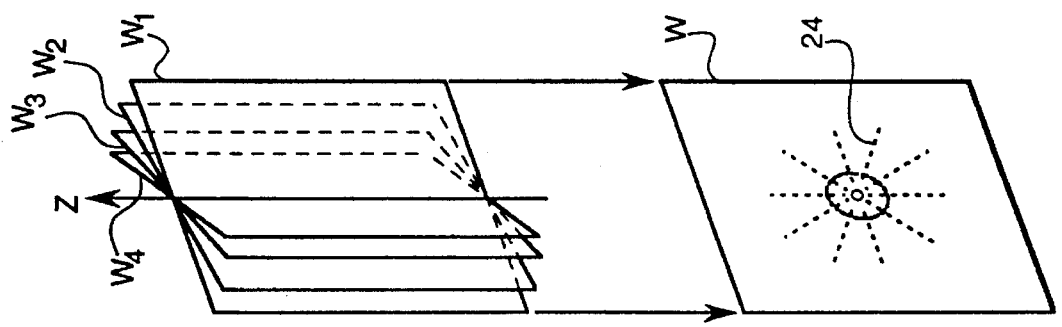
FIG. 2 shows a set of co-axial vertical planes in Radon space.
Figure 3:
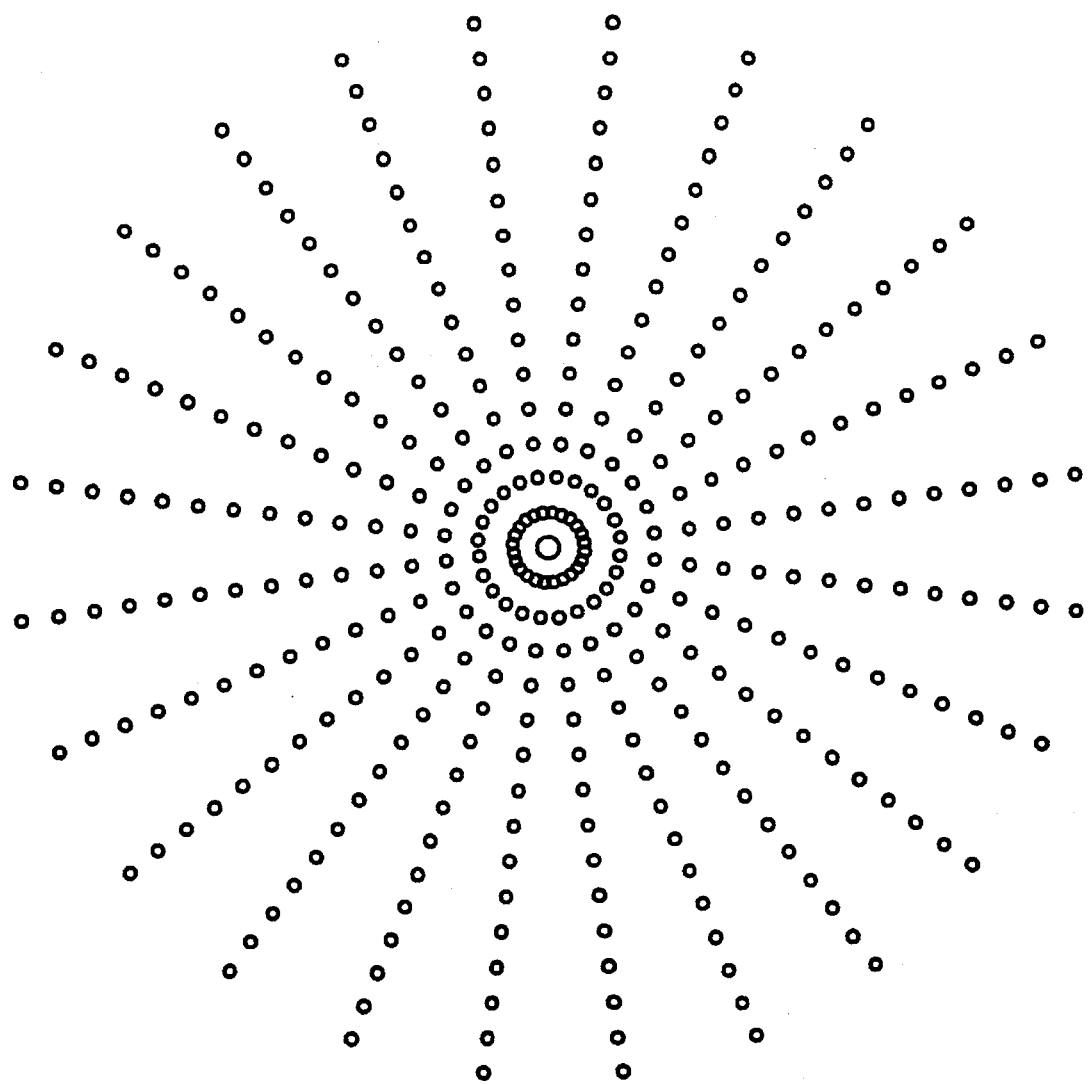
FIG. 3 is a plot of a uniformly spaced polar grid on a vertical plane.

As explained in detail in U.S. Pat. No. 5,257,183, the Radon space of the object of interest 12 is partitioned into a number of vertical co-axial planes $W_r$-$W_n$ disposed about the z-axis as shown in FIG. 2. The planes extend at uniform angle separations completely around the z axis. For example, there could be 90 such planes, each separated from adjacent planes by 2°, extending on two sides of the z axis. Each vertical plane is partitioned into a uniformly spaced polar grid 24. As mentioned earlier, the Radon derivative data is determined on each of the polar grid points in each vertical plane. The polar grid 24 is shown in further detail in FIG. 3. The polar grid includes a plurality of polar grid points 26, forming polar grid lines and circles uniformly spaced in the r, θ, and φ coordinates. In order to meet the sampling criteria necessary for computing the inverse Radon transformation, it is preferable to generate Radon derivative data directly on each of the polar grid points.

Figure 4:
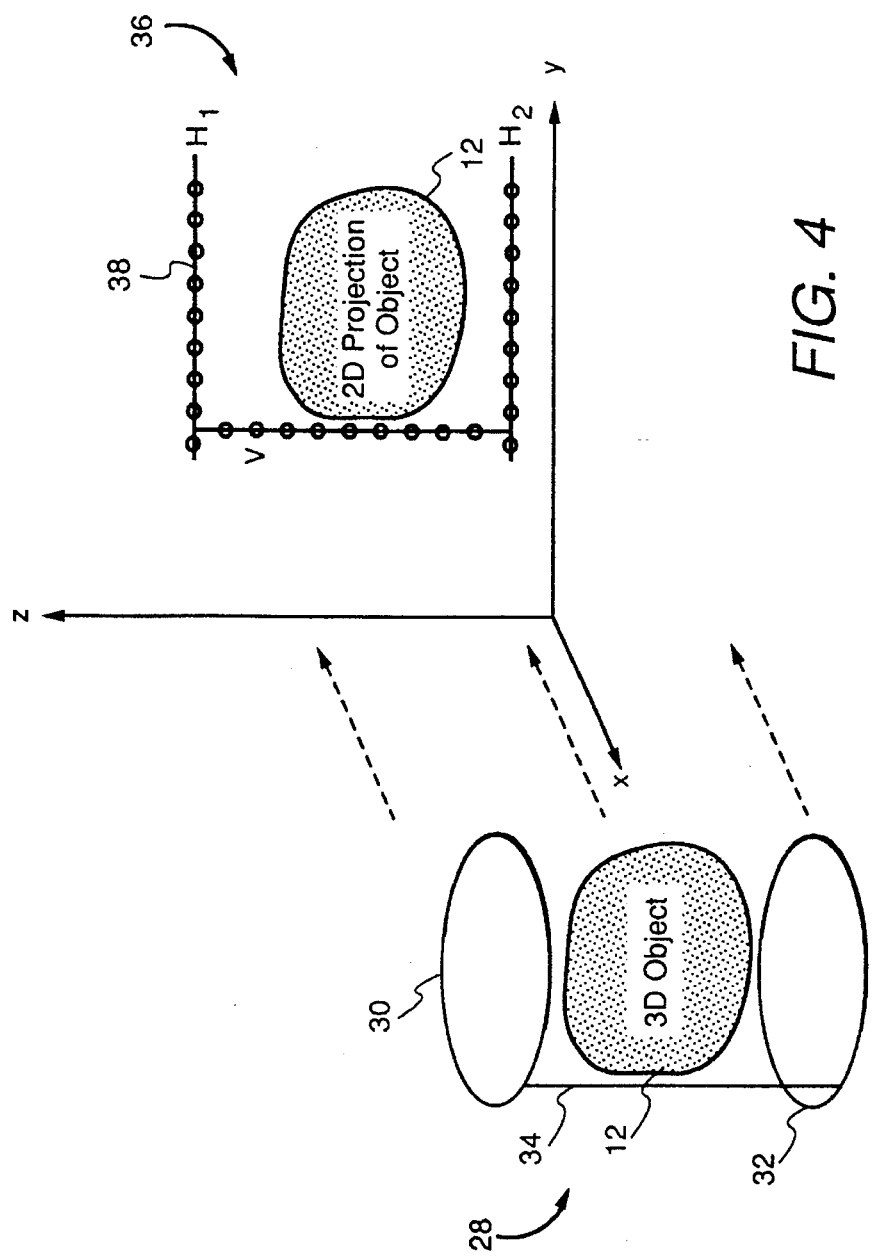
FIG. 4 illustrates a planar projection of a 3D scanning trajectory.

A commonly adopted scanning trajectory for a CT implementation is shown in FIG. 4. In this embodiment, the scanning trajectory 28 comprises two circular scan paths 30 and 32 and a connecting linear scan path 34. The scanning trajectory 28 is projected onto a plane, herein taken for convenience to be the yz plane, and identified as a projected planar scanning trajectory 36 comprising two horizontal lines $H_1$ and $H_2$ and a vertical line V, each comprising a plurality of source positions 38. The horizontal lines $H_1$ and $H_2$ correspond to scan paths 30 and 32, respectively, and the vertical line V corresponds to scan path 34. Note that the 3D object 12 being scanned is also shown projected onto the yz plane as a planar projection of the object.

Figure 5:
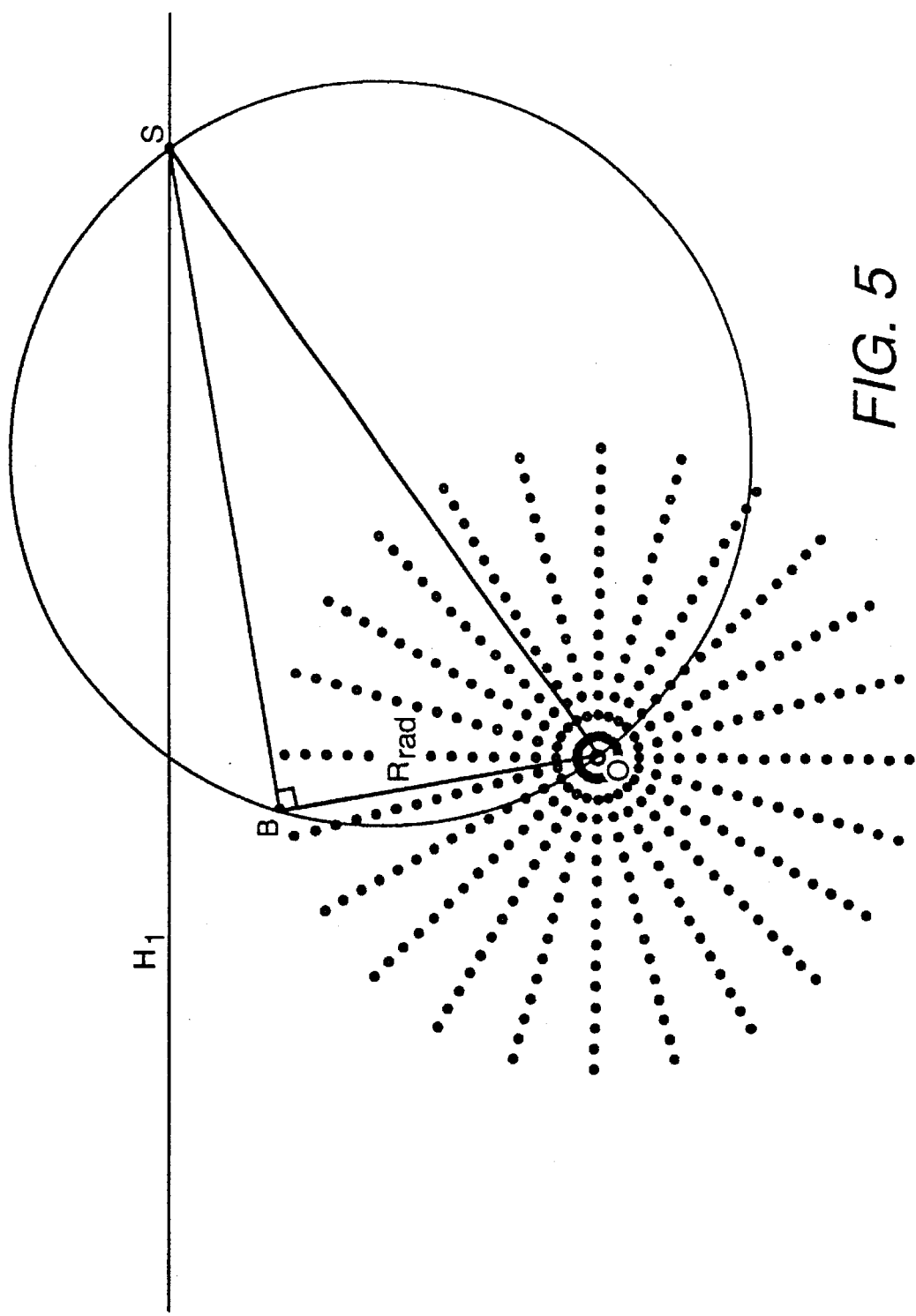
FIG. 5 is a plot of a uniformly spaced polar grid on a vertical plane for the 3D scanning trajectory of FIG. 4.
Figure 6:
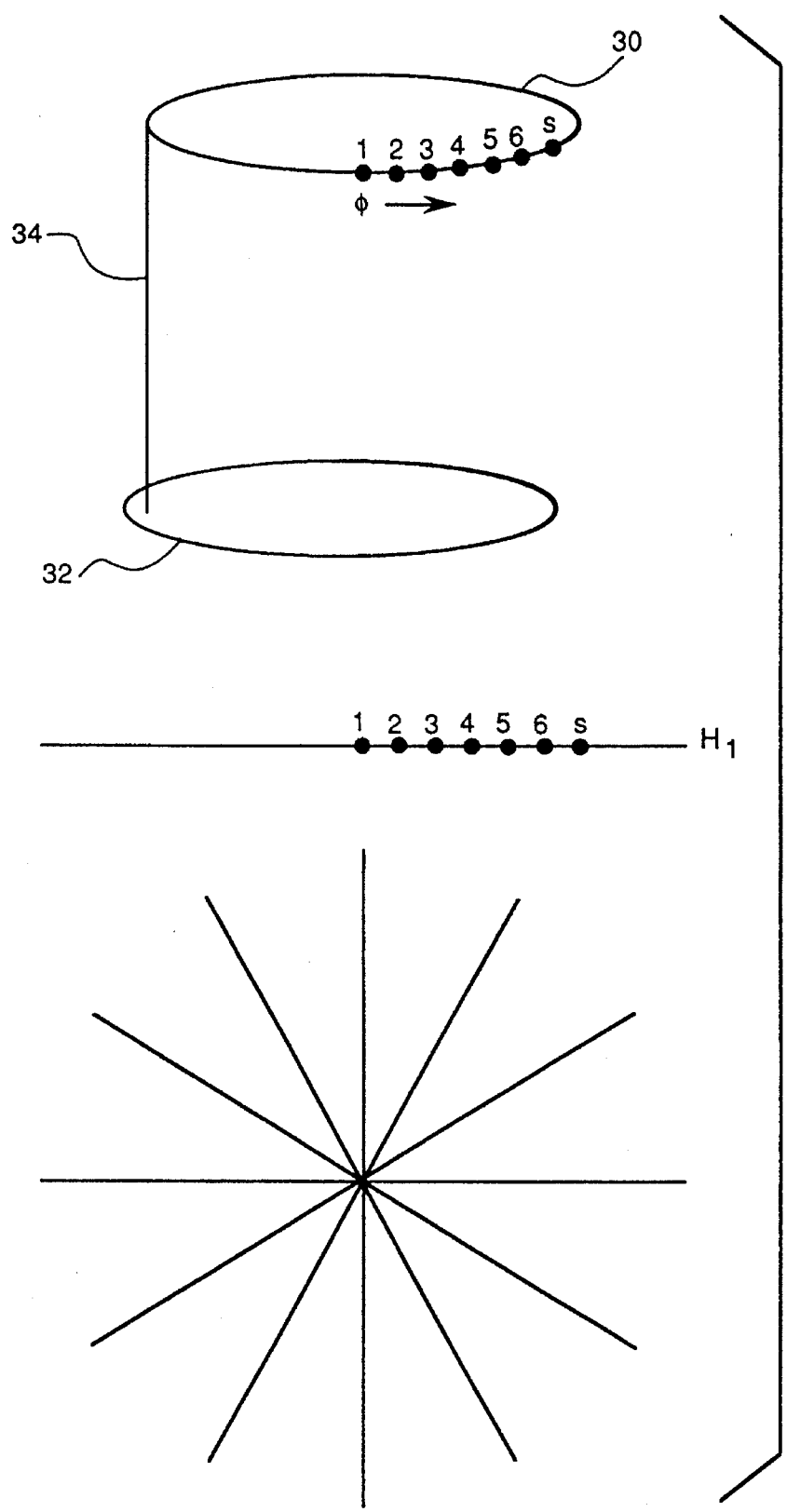
FIG. 6 illustrates the planar projection of the 3D scanning trajectory in further detail.

FIG. 5 is a plot of a uniformly spaced polar grid on a vertical plane in the Radon space taken from the 3D scanning trajectory of FIG. 4. Point O is the origin of the Radon space and $R_{rad}$ is the radius of the circular polar grid. The line labeled $H_1$ is the projection of the scanning trajectory line $H_1$ on the plane. For ease of illustration, note that scanning trajectories $H_2$ and V are not shown. The projection line $H_1$ contains projections of a plurality of source positions at which the cone beam energy is emitted towards the object. FIG. 6 shows the various source positions (i.e., 1, 2, 3, 4, 5, 6, S, . . . etc.) in the φ orientation for the scanning trajectory 30 and their respective projections onto $H_1$. Scanning trajectories 32 and 34 would also have a plurality of source positions with similar projections.

One of these source position projections, S, is shown on projection line $H_1$ in FIG. 5. At source position S, the Radon derivatives that can be generated on the plane are those located on the intersection points between the polar grid lines and the Radon circle, which is the circle with OS as a diameter. Even though the Radon circle intersects each grid line when extended to infinity, only those intersection points that are located within the circular support of the grid carry non-zero Radon derivative values. Therefore, only these values need to be used for computing the Radon derivative data. In FIG. 5, point B is an intersection point which is at a distance $R_{rad}$ from point O. The Radon circle intersects the grid lines within the angular range BOS outside the circular support. The ratio in equation 1 gives the fraction of grid lines having intersection points where the Radon derivatives are non-zero and which should be computed.

$$1 - 2 \times \frac{\text{Angle}BOS}{\pi} \quad (1)$$

Figure 7:
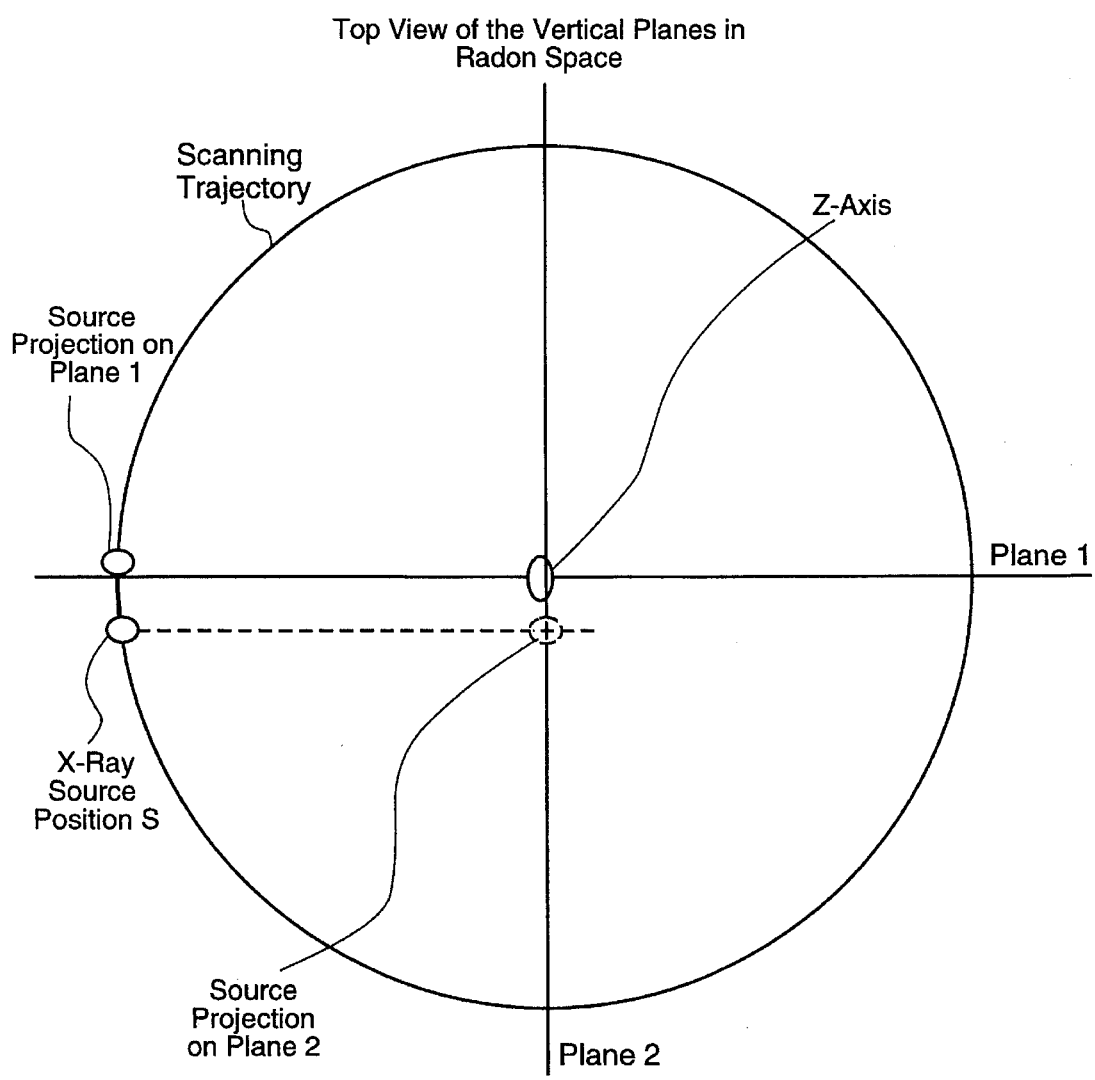
FIG. 7 is an illustration of a source position and its projection onto two planes.

Since $$\text{Angle}BOS = \cos^{-1} \frac{|BO|}{|SO|},$$

it can be easily seen that the fraction is a monotonic decreasing function of the distance |SO|. In other words, a lot of Radon derivative data needs to be computed when the source projection point S is near the center of projection line $H_1$, while only a few Radon derivative needs to be computed when S is located towards the end of line $H_1$. The location of the source projection point S and all other source projection points on projection line $H_1$ is determined by the relative orientation between the plane and the source position. Generally, the projection of source position S will be near the center of projection line $H_1$ when the cone beam energy source faces the plane head on, and the projection of source position S will be near the ends of projection line $H_1$ when the cone beam energy source gazes the plane. This concept is illustrated in FIG. 7, which shows an x-ray source from a position S on the scanning trajectory and its projection onto two planes, plane 1 and plane 2. In FIG. 7, the x-ray source position S grazes plane 1, so its projection will be near the end of a projection line for plane 1, resulting in fewer Radon derivative computations to be performed. However, the x-ray source position S faces plane 2 head on, so its projection will be near the center of a projection line for plane 2, resulting in more Radon derivative computations to be performed.

If the Radon space is partitioned among parallel processors in the manner described above in the background section (i.e., each processor processes adjacent planes), then the projected source position S on the vertical planes will be more or less at the same location along the projection line $H_1$ on all the planes handled by each processor. Therefore, processors that process vertical planes with the projected source positions near the center of projection line $H_1$ will have a lot of Radon derivative computations to do, while processors that process vertical planes with the projected source positions near the ends of projection line $H_1$ will have very little computations to perform. Consequently, the workload of each processor will be very uneven.

The present invention has overcome the above problems by partitioning the processors in a manner where the totality of support of the polar grid handled by each processor is approximately equal. Another feature of the present invention is that the workload in computing Radon derivative data in each processor is approximately even. In the present invention, each processor handles the same number of vertical planes which are equally spaced from O to $\pi$ in the $\phi_k$ orientation. If there are $N_{pr}$ processors and $M \times N_{pr}$ vertical planes, then the vertical planes in the present invention are partitioned between the processors according to the following relationship:

processor 1 processes vertical planes 1, $N_{pr}+1$, $2N_{pr}+1$, ..., $(M-1) \times N_{pr}+1$; processor 2 processes vertical planes 2, $N_{pr}+2$, $2N_{pr}+2$, ..., $(M-1) \times N_{pr}+2$; ... and processor $N_{pr}$ processes vertical planes $N_{pr}$, $2N_{pr}$, $3N_{pr}$, ..., $M \times N_{pr}$.

Since the vertical planes handled by each processor are uniformly distributed in their $\phi_k$ orientation, their orientation with respect to any source position will also be uniformly distributed. Consequently, at any source position, the distribution of its projections on the projection line $H_1$ on the vertical planes, will not change too much from one processor to another processor. Therefore, the total amount of computations performed by each processor will tend to equalize. The advantages of the present invention over the prior art can be fully appreciated with a simple example. If the total number of processors $N_{pr}$ is 5 and the total number of vertical planes M is 5, then using the conventional procedure, processor 1 would process vertical planes 1, 2, 3, ..., 5; processor 2 would process vertical planes 6, 7, 8, ..., 10; ..., and processor $N_{pr}$ would process vertical planes 21, 22, 23 ..., 25. As mentioned above, each processor computes Radon derivative data in consecutive planes, which results in some processors doing a disproportionate amount of work. On the other hand, if the processors process the vertical planes according to the present invention, then processor 1 would process vertical planes 1, 6, 11 ..., 21; processor 2 would process vertical planes 2, 7, 12 ..., 22; ..., and processor $N_{pr}$ would process vertical planes 5, 10, 15 ..., 25. Since the vertical planes handled by each processor are uniformly distributed in their $\phi_k$ orientation, their orientation with respect to any source position will also be uniformly distributed.

In the present invention, M should be greater than 1, with M preferably being greater than 4. M represents the number of vertical planes handled by each processor. The relative orientation between a source position and the totality of the planes handled by each processor varies from one processor to another. This variation in relative orientation decreases as the number of vertical planes handled by each processor increases, and thus the more similar the computation workloads between different processors become. M can be artificially increased by using several procedures. One procedure is to examine the vertical planes and processors in the $\theta_j$ orientation. In this procedure, the index of the digitized $\theta_j$ coordinate runs from 1 to $N_\theta$, wherein $N_\theta$ is the number of grid lines on each vertical plane. If $N_\theta$ is divisible by an integer $M_\theta$, then the polar grid lines on each vertical plane can be divided into $M_\theta$ subgroups as follows:

$$1, 1+M_\theta, 1+2M_\theta, \ldots, N_\theta - M_\theta + 1;$$
$$2, 2+M_\theta, 2+2M_\theta, \ldots, N_\theta - M_\theta + 2;$$
$$\vdots$$
$$M_\theta, 2M_\theta, 3M_\theta, \ldots, N_\theta.$$

Figure 8:
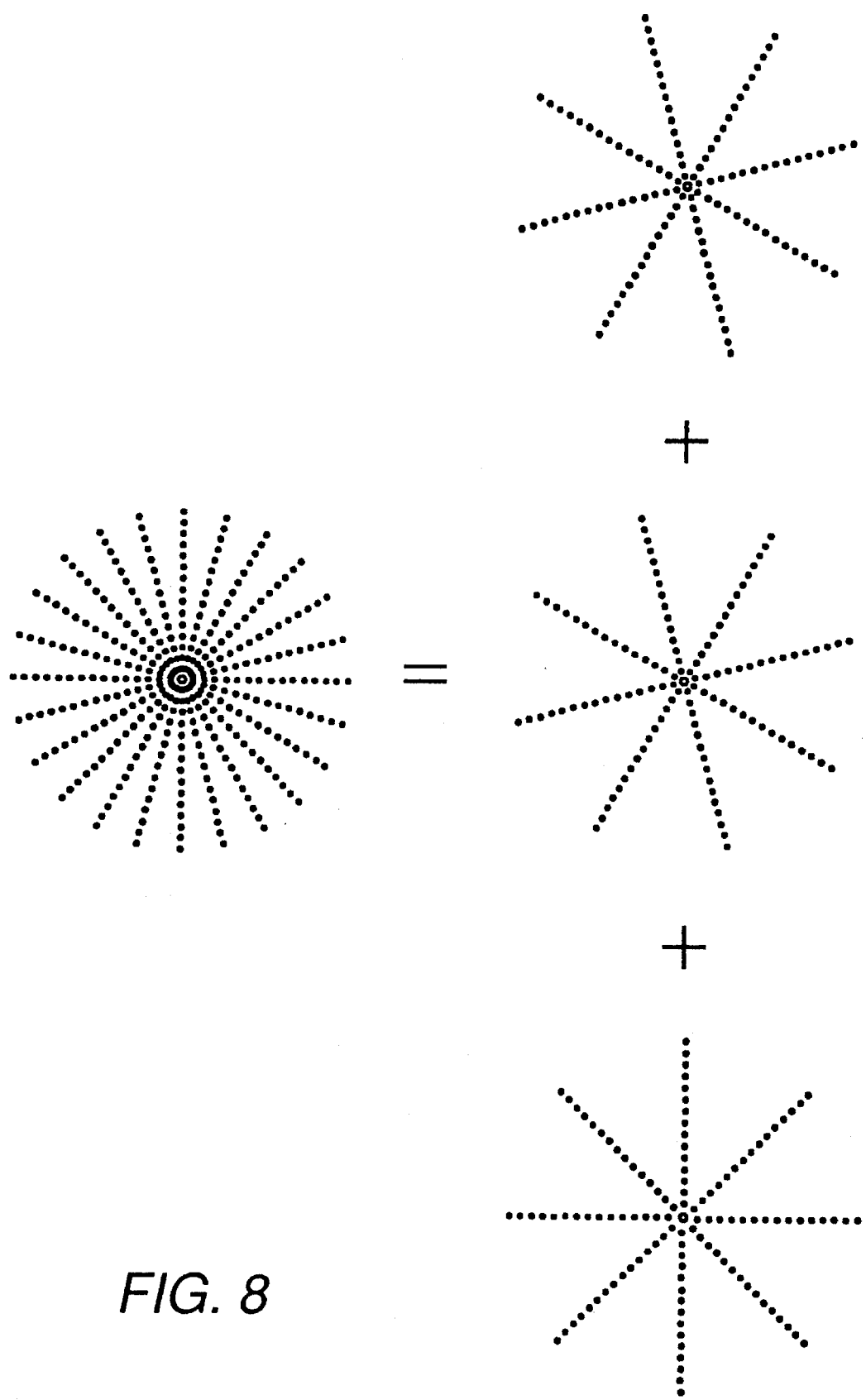
FIG. 8 is a plot showing the polar grid divided into sub-groups of grid lines.

FIG. 8 is an example of a plot showing a polar grid having 24 grid lines being divided into three sub-groups each having eight grid lines. In the present invention, each grid line subgroup on a vertical plane has the same distribution pattern as the original polar grid lines, and thus the same pattern of intersection with the Radon circle. By dividing the polar grid into the sub-groups, each sub-group will have $1/M_\theta$ the number of grid points as the original polar grid lines, so each processor can handle $M \times M_\theta$ grid line sub-groups. Therefore, the effective M factor (i.e., the number of vertical planes handled by each processor) has been increased $M_\theta$ fold. In FIG. 8, the number of grid lines, $N_\theta$, equals 24 and the sub-group integer $M_\theta$, equals three. Suppose that there are 100 vertical planes each having 24 grid lines and the amount of processors, $N_{pr}$, equals 100. Then there will be 300 (3 sub-groups×100 vertical planes) sub-groups of planes. Each processor will process three (300 sub-groups/100 processors) sub-groups of planes, each having eight grid lines.

Another way to increase the number of vertical planes handled by each processor, M, is to let the index of the digitized $r_i$ coordinate run from 1 to $N_r$, wherein $N_r$ equals the number of grid circles on each vertical plane. If $N_r$ is divisible by an integer $M_r$, then the polar grid circles on each vertical plane can be divided into $M_r$ sub-groups as follows:

$$1, 1+M_r, 1+2M_r, \ldots, N_r - M_r + 1;$$
$$2, 2+M_r, 2+2M_r, \ldots, N_r - M_r + 2;$$
$$\vdots$$
$$M_r, 2M_r, 3M_r, \ldots, N_r.$$

Figure 9:
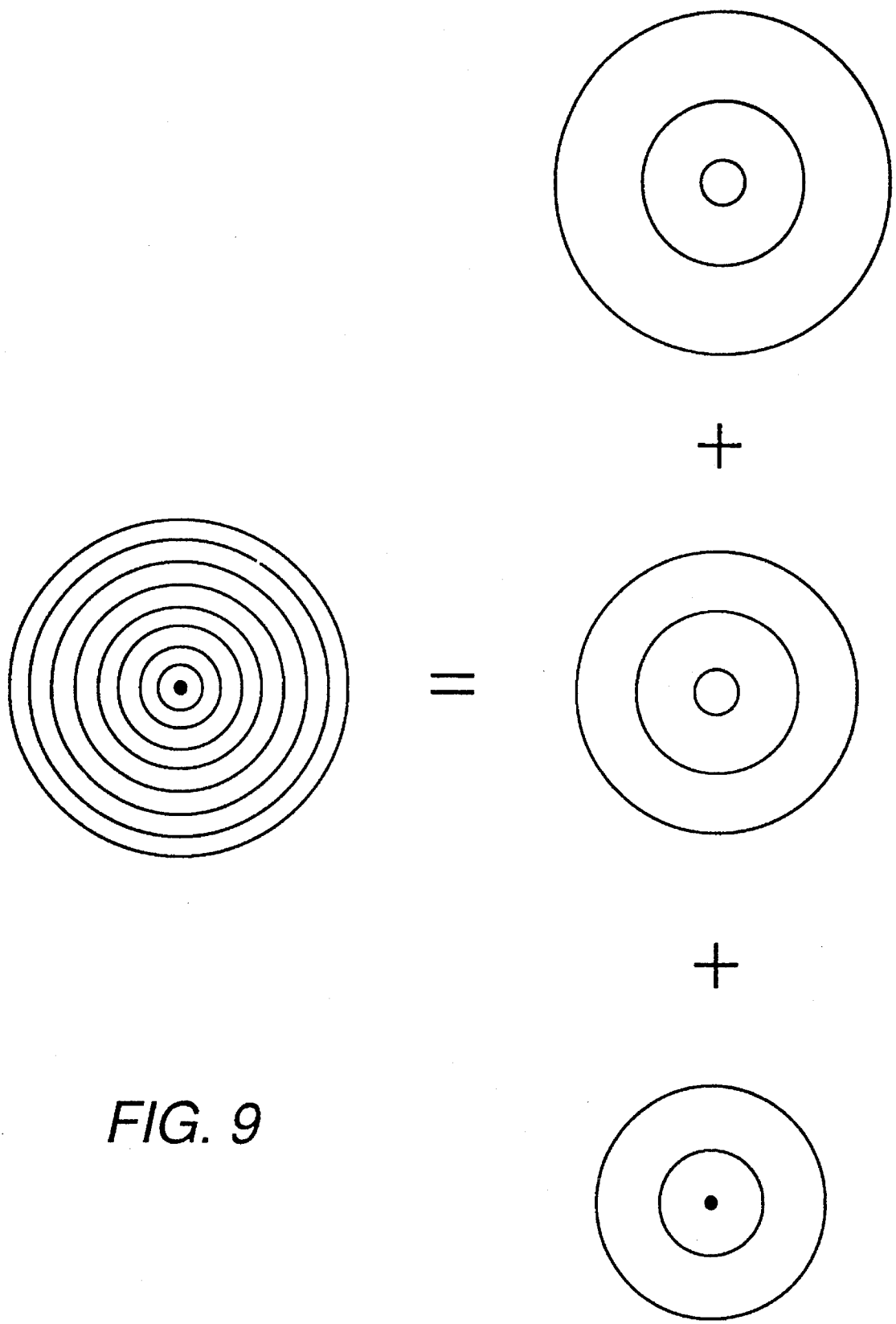
FIG. 9 is a plot showing the polar grid divided into sub-groups of grid circles.

FIG. 9 is an example of a plot showing a polar grid having nine grid circles being divided into three sub-groups each having three grid circles. In the present invention, each grid circle sub-group on a vertical plane has the same distribution pattern as the original polar grid circles, and thus the same pattern of intersection with the Radon circle. By dividing the polar grid into the sub-groups, each subgroup will have $1/M_r$ the number of grid points as the original polar grid circles, so each processor can handle $M \times M_r$ grid circle sub-groups. Therefore, the effective M factor has been increased $M_r$ fold. In FIG. 9, the number of grid lines, $N_r$, equals nine and the sub-group integer $M_r$, equals three. Suppose that there are 100 vertical planes each having nine grid circles and the amount of processors, $N_{pr}$, equals 100. Then there will be 300 (3 sub-groups×100 vertical planes) sub-groups of planes. Each processor will process three (300 sub-groups/100 processors) sub-groups of planes, each having three grid circles.

After the plurality of processors have computed the Radon derivative data for the polar grid points on the various vertical planes in the above-described manner, the Radon derivative data is integrated and converted into Radon data. Then the inverse Radon transformation is performed using the techniques described in U.S. patent application Ser. No. 07/631,818 and then a reconstructed image is generated and subsequently displayed.

It is therefore apparent that there has been provided in accordance with the present invention, a method and system for efficiently generating Radon derivative data in a cone beam CT implementation that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A method for generating Radon derivative data in a computerized tomography system having a plurality of processors, the method comprising the steps of:

providing a scanning trajectory about an object;

discretely sampling the scanning trajectory with a plurality of uniformly spaced cone beam source positions;

emitting cone beam energy from the discretely sampled cone beam source positions towards the object;

acquiring cone beam energy passing through the object on a detector, the cone beam energy acquired on the detector is cone beam projection data;

partitioning the cone beam projection data into a plurality of vertical planes in Radon space, each vertical plane having a polar grid with a plurality of polar grid lines, circles, and points uniformly spaced in r, θ, and φ coordinates;

partitioning the plurality of vertical planes between the plurality of processors wherein each processor processes an equal amount of vertical planes evenly spaced within 180°; and generating Radon derivative data for each vertical plane with the plurality of processors.

2. The method according to claim 1, wherein there are $N_{pr}$ processors and $M \times N_{pr}$ vertical planes and the vertical planes are partitioned between the processors according to the following relationship:

processor 1 processes vertical planes 1, $N_{pr}+1$, $2N_{pr}+1$, ..., $(M-1) \times N_{pr}+1$; processor 2 processes vertical planes 2, $N_{pr}+2$, $2N_{pr}+2$, ..., $(M-1) \times N_{pr}+2$; ... and processor $N_{pr}$ processes vertical planes $N_{pr}$, $2N_{pr}$, $3N_{pr}$, ..., $M \times N_{pr}$.

3. The method according to claim 2, wherein M is greater than 1.

4. The method according to claim 3, wherein M is greater than 4.

5. The method according to claim 2, wherein each polar grid in a vertical plane has $N_θ$ grid lines being divisible by an integer $M_θ$ into $M_θ$ sub-groups comprising grid lines:

$$1, 1 + M_θ, 1 + 2M_θ, \ldots, N_θ - M_θ + 1;$$
$$2, 2 + M_θ, 2 + 2M_θ, \ldots, N_θ - M_θ + 2;$$
$$\vdots$$
$$M_θ, 2M_θ, 3M_θ \ldots, N_θ.$$

6. The method according to claim 2, wherein each polar grid in a vertical plane has $N_r$ grid circles being divisible by an integer $M_r$ into $M_r$ sub-groups comprising grid circles:

$$1, 1 + M_r, 1 + 2M_r, \ldots, N_r - M_r + 1;$$
$$2, 2 + M_r, 2 + 2M_r, \ldots, N_r - M_r + 2;$$
$$\vdots$$
$$M_r, 2M_r, 3M_r, \ldots, N_r.$$

7. A method for generating Radon derivative data in a cone beam computerized tomography system having a plurality of processors $N_{pr}$, the method comprising the steps of:

providing a scanning trajectory about an object;

discretely sampling the scanning trajectory with a plurality of uniformly spaced cone beam source positions;

emitting cone beam energy from the discretely sampled cone beam source positions towards the object;

acquiring cone beam energy passing through the object on a detector, the cone beam energy acquired on the detector is cone beam projection data;

partitioning the cone beam projection data into a plurality of $M \times N_{pr}$ vertical planes in Radon space, each vertical plane having a polar grid with a plurality of polar grid lines, circles, and points uniformly spaced in r, θ, and φ coordinates;

partitioning the plurality of vertical planes between the plurality of processors wherein each processor processes an equal amount of vertical planes evenly spaced within 180° in φ orientation according to the following relationship:

processor 1 processes vertical planes 1, $N_{pr}+1$, $2N_{pr}+1$, ..., $(M-1) \times N_{pr}+1$; processor 2 processes vertical planes 2, $N_{pr}+2$, $2N_{pr}+2$, ..., $(M-1) \times N_{pr}+2$; ... and processor $N_{pr}$ processes vertical planes $N_{pr}$, $2N_{pr}$, $3N_{pr}$, ..., $M \times N_{pr}$; and generating Radon derivative data for each vertical plane.

8. The method according to claim 7, wherein M is greater than 1.

9. The method according to claim 8, wherein M is greater than 4.

10. The method according to claim 7, wherein each polar grid in a vertical plane has $N_θ$ grid lines being divisible by an integer $M_θ$ into $M_θ$ sub-groups comprising grid lines:

$$1, 1 + M_θ, 1 + 2M_θ, \ldots, N_θ - M_θ + 1;$$
$$2, 2 + M_θ, 2 + 2M_θ, \ldots, N_θ - M_θ + 2;$$
$$\vdots$$
$$M_θ, 2M_θ, 3M_θ \ldots, N_θ.$$

11. The method according to claim 7, wherein each polar grid in a vertical plane has $N_r$ grid circles being divisible by an integer $M_r$ into $M_r$ sub-groups comprising grid circles:

$$1, 1 + M_r, 1 + 2M_r, \ldots, N_r - M_r + 1;$$
$$2, 2 + M_r, 2 + 2M_r, \ldots, N_r - M_r + 2;$$
$$\vdots$$
$$M_r, 2M_r, 3M_r, \ldots, N_r.$$

12. A cone beam computerized tomography system, comprising:

a cone beam energy source;

scanning means for moving the cone beam energy source about an object, the scanning means emitting cone beam energy at the object from a plurality of uniformly spaced cone beam source positions;

a detector for acquiring cone beam energy passing through the object, the cone beam energy acquired on the detector is cone beam projection data; and a plurality of processors coupled to the detector, each of the plurality of processors comprising means for partitioning the cone beam projection data into a plurality of vertical planes in Radon space, each vertical plane having a polar grid with a plurality of polar grid lines, circles, and points uniformly spaced in r, θ, and φ coordinates, each processor processing an equal amount of vertical planes evenly spaced within 180°; and means for generating Radon derivative data for each vertical plane.

13. The system according to claim 12, wherein there are $N_{pr}$ processors and $M \times N_{pr}$ vertical planes and the vertical planes are partitioned between the processors according to the following relationship:

processor 1 processes vertical planes 1, $N_{pr}+1$, $2N_{pr}+1$, ..., $(M-1) \times N_{pr}+1$; processor 2 processes vertical planes 2, $N_{pr}+2$, $2N_{pr}+2$, ..., $(M-1) \times N_{pr}+2$; ... and processor $N_{pr}$ processes vertical planes $N_{pr}$, $2N_{pr}$, $3N_{pr}$, ..., $M \times N_{pr}$.

14. The system according to claim 13, wherein M is greater than 1.

15. The system according to claim 14, wherein M is greater than 4.

16. The system according to claim 13, wherein each polar grid in a vertical plane has $N_\theta$ grid lines being divisible by an integer $M_\theta$ into $M_\theta$ sub-groups comprising grid lines:

$1, 1+M_\theta, 1+2M_\theta, \ldots, N_\theta - M_\theta + 1;$
$2, 2+M_\theta, 2+2M_\theta, \ldots, N_\theta - M_\theta + 2;$
.
.
.
$M_\theta, 2M_\theta, 3M_\theta \ldots, N_\theta.$ 17. The system according to claim 13, wherein each polar grid in a vertical plane has $N_r$ grid circles being divisible by an integer $M_r$ into $M_r$ sub-groups comprising grid circles:

$1, 1+M_r, 1+2M_r, \ldots, N_r - M_r + 1;$
$2, 2+M_r, 2+2M_r, \ldots, N_r - M_r + 2;$
.
.
.
$M_r, 2M_r, 3M_r \ldots, N_r.$ 18. A cone beam computerized tomography system, comprising:

means for providing a scanning trajectory about an object;

means for discretely sampling the scanning trajectory with a plurality of uniformly spaced cone beam source positions;

means for emitting cone beam energy from the discretely sampled cone beam source positions towards the object;

means for acquiring cone beam energy passing through the object on a detector, the cone beam energy acquired on the detector is cone beam projection data;

means for partitioning the cone beam projection data into a plurality of $M \times N_{pr}$ vertical planes in Radon space, each vertical plane having a polar grid with a plurality of polar grid lines, circles, and points uniformly spaced in r, θ, and φ coordinates;

a plurality of $N_{pr}$ processors organized to partition the plurality of vertical planes, wherein each processor processes an equal amount of vertical planes evenly spaced within 180° in φ orientation according to the following relationship:

processor 1 processes vertical planes 1, $N_{pr}+1$, $2N_{pr}+1$, ..., $(M-1) \times N_{pr}+1$; processor 2 processes vertical planes 2, $N_{pr}+2$, $2N_{pr}+2$, ..., $(M-1) \times N_{pr}+2$; ... and processor $N_{pr}$ processes vertical planes $N_{pr}$, $2N_{pr}$, $3N_{pr}$, ..., $M \times N_{pr}$; and means for generating Radon derivative data for each vertical plane.

19. The system according to claim 18, wherein M is greater than 1.

20. The system according to claim 19, wherein M is greater than 4.

21. The system according to claim 18, wherein each polar grid in a vertical plane has $N_\theta$ grid lines being divisible by an integer $M_\theta$ into $M_\theta$ sub-groups comprising grid lines:

$1, 1+M_\theta, 1+2M_\theta, \ldots, N_\theta - M_\theta + 1;$
$2, 2+M_\theta, 2+2M_\theta, \ldots, N_\theta - M_\theta + 2;$
.
.
.
$M_\theta, 2M_\theta, 3M_\theta \ldots, N_\theta.$ 22. The system according to claim 18, wherein each polar grid in a vertical plane has $N_r$ grid circles being divisible by an integer $M_r$ into $M_r$ sub-groups comprising grid circles:

$1, 1+M_r, 1+2M_r, \ldots, N_r - M_r + 1;$
$2, 2+M_r, 2+2M_r, \ldots, N_r - M_r + 2;$
.
.
.
$M_r, 2M_r, 3M_r \ldots, N_r.$

* * * * *